May 7, 1929.  DE WITT E. YATES  1,712,190
HIGH SPEED FIRE PUMP ATTACHMENT FOR AUTOMOBILES
Filed Sept. 19, 1927   2 Sheets-Sheet 1

INVENTOR.
De Witt E. Yates
BY
Alexander Lowell
ATTORNEYS

May 7, 1929.   DE WITT E. YATES   1,712,190
HIGH SPEED FIRE PUMP ATTACHMENT FOR AUTOMOBILES
Filed Sept. 19, 1927   2 Sheets-Sheet 2

INVENTOR.
Dewitt E. Yates
BY
Alexander Dowell
ATTORNEYS

Patented May 7, 1929.

1,712,190

UNITED STATES PATENT OFFICE.

DE WITT E. YATES, OF BATTLE CREEK, MICHIGAN, ASSIGNOR TO AMERICAN STEAM PUMP COMPANY, OF BATTLE CREEK, MICHIGAN, A CORPORATION OF MICHIGAN.

HIGH-SPEED FIRE-PUMP ATTACHMENT FOR AUTOMOBILES.

Application filed September 19, 1927. Serial No. 220,336.

This invention is an improvement in pump attachments for automobile vehicles of the type shown in Letters Patent No. 1,538,881, dated May 26, 1925 and application for patent, Serial No. 88,421, filed February 15, 1926.

The object of the present invention is to provide a high pressure single stage centrifugal pump adapted to be driven by a set of speed increasing gears from the drive shaft of the attachment, which is adapted to be driven by a coupling shaft from the motor shaft of the automobile, when the attachment is applied thereto, the improved attachment being interchangeable with the line of patented Barton pumps heretofore referred to.

Another object of the invention is to provide a novel arrangement of clutches whereby the pump in starting will be driven through friction clutches and when in full operation will be driven through positive clutches.

A further object is to provide means whereby the end thrust loads on the pump and shaft are offset or neutralized.

In the accompanying drawings I have illustrated one practical embodiment of the invention and will describe the same in detail with reference thereto, and summarize in the claims the essentials of the invention and the novel features of construction and novel combination of parts for which protection is desired.

Figure 1:
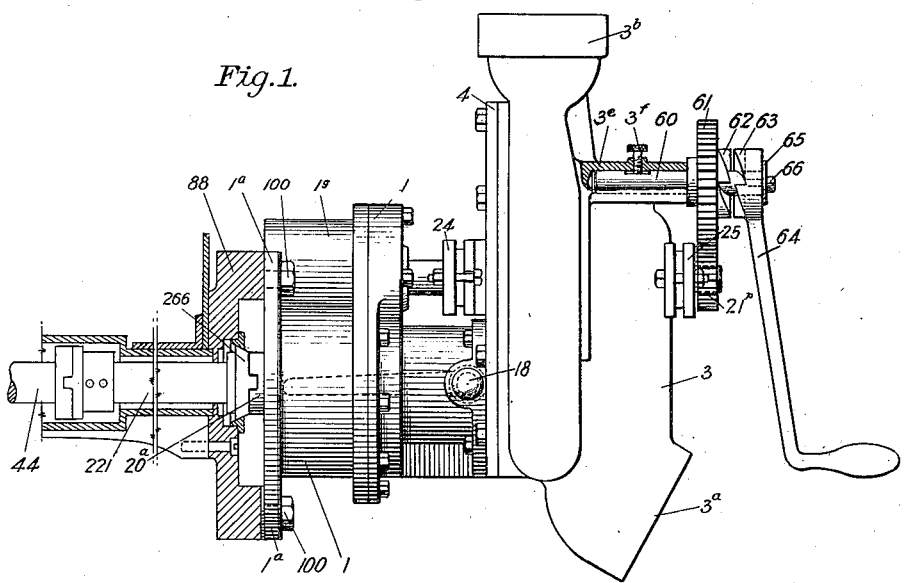
Figure 1 is a side view of the novel pump attachment as applied to the motor end of an automobile substantially as described in my aforesaid patent.

The pump attachment comprises a frame or casing 1 which is provided at one end with flanges 1ª by which it may be fastened to a supporting bracket 88 by means of bolts 100. This supporting bracket 88 is attached to the front cross member of the chassis frame of the motor vehicle substantially as described in my Patent No. 1,538,881. Projecting through the bracket 88 is the front end of a coupling shaft 221 which is adapted to be driven from the motor shaft 44 as described in my said patent and application.

The shaft 221 has a coupling member 266 on its outer end adapted to engage an opposed coupling member 20ª on the end of the drive shaft 20 of the attachment hereinafter referred to. For the purpose of the present case it is not necessary to describe these bracket and coupling shafts further as the present invention resides in the construction of the pump attachment.

Within the casing 1 is mounted a driving shaft 20 which has a coupling member 20ª on its outer end adapted to be engaged with the coupling member 266 on shaft 221, and be driven thereby when the attachment is attached to the vehicle, this shaft 20 being at all times so engaged with the coupling shaft so as to be driven by it when the attachment is in place on the machine.

The shaft 20 is rotatably supported at one end in a clutch sleeve 8 and at its other end in a clutch sleeve 9. A bushing 34 is interposed between the shaft 20 and sleeve 8; and the shaft rotates within the sleeve 8. The sleeve 9 is keyed to the shaft 20 and rotates therewith. The sleeve 8 is supported in a ball bearing 40 which is confined in position in an annular flange 1ᵇ in the casing. Said flange having a contracted inner end 1ᶜ against which the inner side of the ball race is fixedly confined by an annular collar 15 which surrounds the coupling member 20ª on shaft 20.

The sleeve 8 is confined against longitudinal movement in the casing by a gear 32 keyed on the sleeve 8 at the inner side of ball race 40, and a collar 13 secured on the outer end of the sleeve at the opposite side of the ball race as shown in the drawing.

The sleeve 9 is carried by a ball bearing 39 which is in turn mounted in a casting 17 slidably fitted in a tubular portion 1ᵈ of the casing. Bearing 39 abuts at one side against a shoulder in the casting 17 and is securely retained against the shoulder by means of an annular nut 16 screwed into the inner end of casting 17 as shown. The ball race 39 has no longitudinal movement on the sleeve 9, being confined between a shoulder of the sleeve and an annular nut 12 screwed on the sleeve as shown.

The sleeve 9, bearing 39 and casting 17 may be moved bodily as a unit toward or from the sleeve 8 and preferably such movement is effected by means of an eccentric part 18ª of a shaft 18, journalled in bearings 1ᵉ in the casing in rear of and at right angles to the shaft 20; one side of the eccentric portion 18ª of the shaft engaging the outer end of the casting 17 and the other side engaging a plate 19 which is fastened to the casting 17 by means of screws 42 as indicated in the drawings. Shaft 18 may be rocked by a hand lever 18ᵇ when it is desired to move the casting 17 and sleeve 9 longitudinally of shaft 20.

Figures 2, 5:
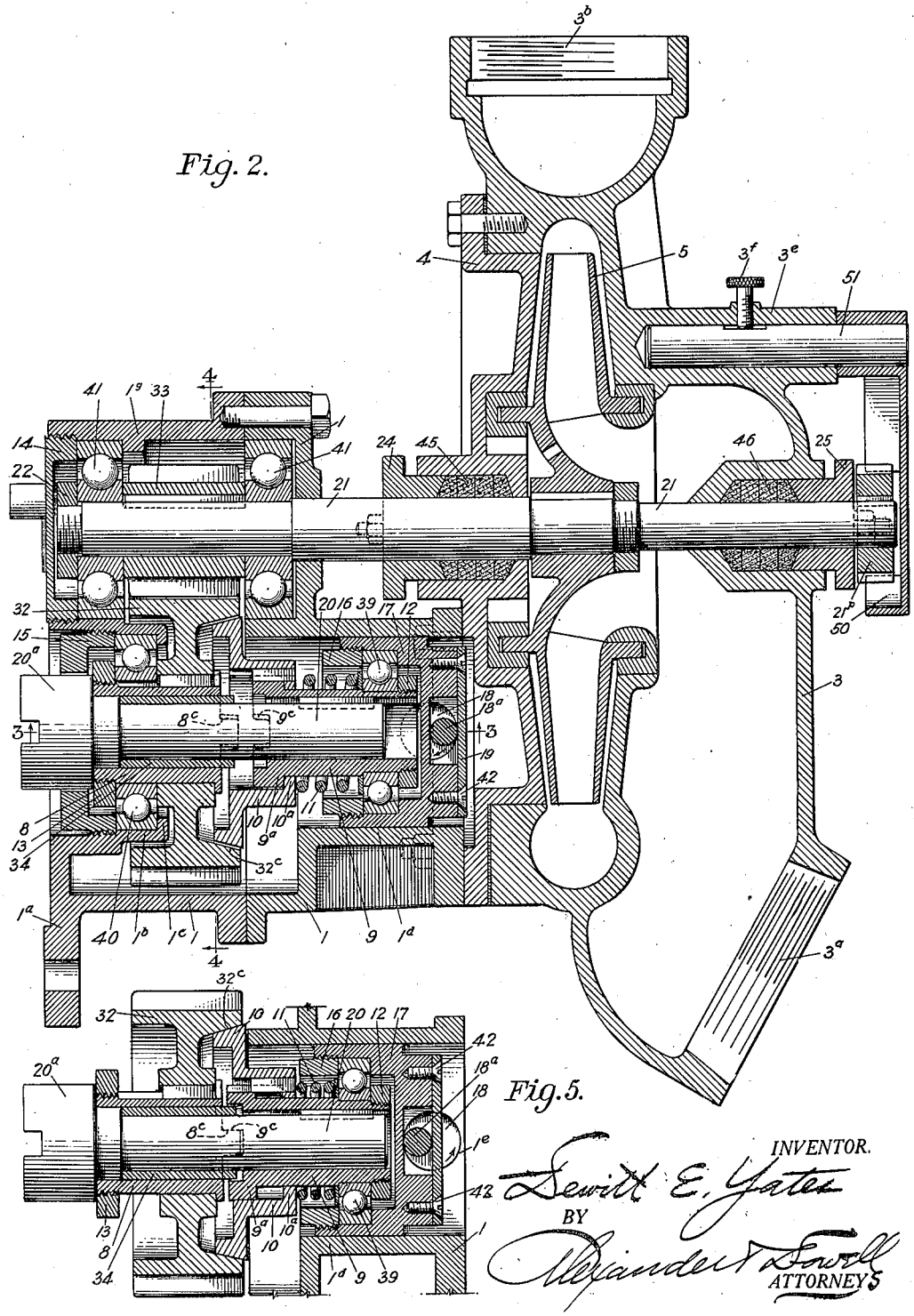
Fig. 2 is an enlarged longitudinal vertical section through the pump attachment detached.
Fig. 5 is a sectional view showing the positive clutch engagement.

The opposed ends of the sleeve 8 and 9 are provided with positive interengaging clutch members 8ᶜ, 9ᶜ, which are adapted to be interengaged when the sleeve 9 is moved fully toward the sleeve 8, see Figure 5; but in the retracted position of sleeve 9, see Figure 2, the clutch members 8ᶜ, 9ᶜ are disengaged.

Slidably mounted upon the sleeve 9 is a friction member 10 which is preferably a cone-friction member adapted to engage an internally tapered friction member 32ᶜ on the inner periphery of the flange of the gear 32. This friction member 10 has a flange 10ª on its hub engaging an opposed flange 9ª on sleeve 9 to limit the inward movement of the friction member 10 on the sleeve 9. When the clutch is disengaged the friction member 10 is normally pushed to its innermost position on the sleeve, and against the flange 9ª by a helical spring 11 which is interposed between the hub of the friction member 10 and the ball race 39.

Figures 3, 4:
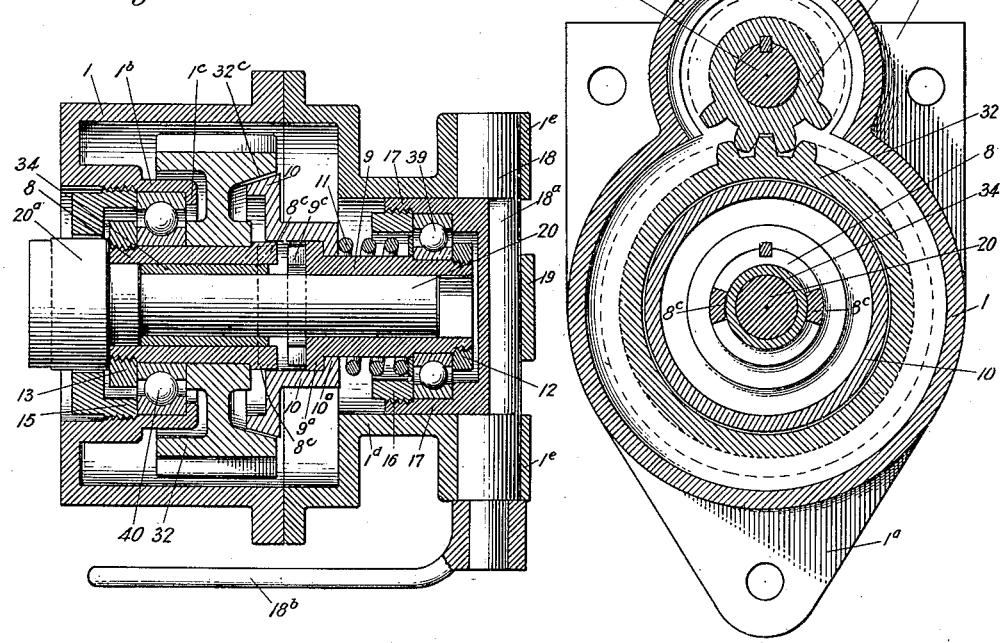
Fig. 3 is a section on the line 3—3, Fig. 2.
Fig. 4 is a section on the line 4—4, Fig. 2.

When the parts are in the position shown in Figure 3 the friction clutch member 10 is disengaged from the friction clutch member of gear 32, but when the eccentric 18ª is shifted to move the sleeve 17 and clutch sleeve 9 towards clutch sleeve 8, the disk 10 is first frictionally engaged with the gear 32, wherefore the gear 32 would be frictionally clutched to shaft 20; then by the further inward movement of the sleeve 9, the friction member 10 is more forcibly pressed against the gear 32 by the compression of spring 11 until the resistance of the spring is overcome and the positive clutch faces 8ᶜ, 9ᶜ are engaged; thereupon the gear 32 would be positively clutched to the shaft 20. On the reverse movement of the sleeve 9 the positive clutch members 8ᶜ, 9ᶜ are disengaged before the friction member 10 is disengaged. Thus in both the engaging and disengaging of the gear 32 and shaft 20 there is no abrupt shock.

The gear 32 on shaft 20 meshes with a pinion 33 keyed on one end of a pump shaft 21, which end is journalled in ball bearings 41 on opposite sides of the pinion 33 and within a housing 1ᵍ forming part of the casing 1. Said bearings 41 are being secured on opposite sides of the pinion 33, and between the outer end of the housing 1ᵍ and a head 14 screwed into the inner end of the housing 1ᵍ. The inner members of the ball race are clamped between a shoulder on the shaft and a nut 22 on the adjacent end of the shaft.

The shaft 21 extends axially through the pump chamber of a centrifugal pump casing of any suitable construction attached to the outer end of the casing 1. As shown the pump casing has a member or head 4 attached to the casing 1ᵍ, and an outer casing member 3 attached to the head 4 having an inlet 3ª and an outlet 3ᵇ. An impeller 5 is mounted upon the shaft 21 within the pump chamber. The pump casing is provided with stuffing boxes 45 and 46 and glands 24 and 25 around the shaft at opposite sides of the pump casing. As particular construction of the pump is not a feature of the present invention, further description thereof is unnecessary.

Preferably the ball bearings or ball races 39, 40 and 41, are of the deep groove type adapted to carry both thrust and radial loads. The friction clutches 10 and 32 are disengaged when eccentric 18ª is thrown to the extreme out position shown in Fig. 2; for when the eccentric is thrown so as to bring the clutches together, the friction clutch member 10 engages first and is pressed in by spring 11. This engagement starts the pump and brings the speed of gear 32 up to that of the motor. (The load at this time should be light.) As the eccentric is thrown over farther to the in position, the spring 11 is further compressed and finally the jaw clutch members 8ᶜ and 9ᶜ come together in positive engagement and carry the heavy load of the pump while in service,—the friction clutch members are used for starting the pump.

The clutch member 10 would normally be withdrawn away from the face of taper clutch member, as in Fig. 2. The clutch members 8ᶜ on the inner end of the clutch member 8 project beyond the outer periphery of the sleeve and beyond the bore of the gear 32 and serve to prevent the sleeve 8 being drawn through the gear, said sleeve being securely clamped to the gear between the clutch members 8ᶜ and the ring nut 13 as shown in Fig. 3.

The clearance between the clutch members 8ᶜ and 9ᶜ on sleeves 8 and 9 is made large to permit easy engagement of these lugs when the sleeve 9 is moved toward the sleeve 8.

The gear 32 and pinion 33 are preferably helical cut, and an inherent characteristic of this type of gear is considerable end thrust which must ordinarily be sustained by special thrust bearings. The end thrust of the driving gear 32 however is carried partially by the bearing 40 and partially by bearing 39 through the clutch spring 11. The end thrust of the driven pinion is pitted against the end thrust of the pump, partially compensating another unavoidable thrust load and relieving the resultant load on bearing 41.

It will be seen from the foregoing description that this attachment provides a centrifugal pump having a positive or jaw type clutch co-acting with a friction clutch, the positive clutch being engaged after the parts have been brought to the same rotative speed by the friction clutch. The eccentric is adapted to cause elastic engagement of the friction clutch members, and positive engagement of the jaw clutch members, and positive disengagement of both clutches. The sleeve 9, casting 17 and ball bearing 39 are adapted to be forcibly moved as a unit in an axial direction so as to carry the driving clutch in and out of engagement, said ball bearing being also adapted to carry the radial load of the driving shaft and the axial load of the clutch members. The friction clutch member 10 is adapted to drive the helical gear 32, and the spring 11 carries engagement of said friction clutch, and resists the end thrust of said helical gear.

The driven helical pinion 33 is adapted to exert an axial force or end thrust in a direction opposite to or opposing the axial force or end thrust exerted by the impeller of the pump and the driving helical gear 32 is adapted to resist the thrust of the spring 11 in forcing the friction clutch member 10 into engagement with the friction clutch member on said gear.

In order to facilitate starting the engine without having to remove the attachment in order to crank the engine, if cranking becomes necessary a pinion 21ᴾ is attached to the outer end of the pump shaft 21, said pinion is normally housed by a member 50 attached to a stub shaft 51, (see Fig. 2) which is removably secured in a socket member 3ᵉ on the pump casing 3 above and parallel with the shaft 21 at the outer end of the pump casing. The stud 51 may be removably secured in position by a screw 3ᶠ, see Fig. 2. If it should become necessary to crank the engine while the pump attachment is in position, the housing 50 and shaft 51 are removed, and in place thereof a stub shaft 60 carrying a gear 61 is inserted in the socket member 3ᵉ, the gear 61 meshing with the pinion 21ᴾ. The gear 61 has clutch faces 62 on its outer face which are adapted to be engaged by opposed clutch faces 63 on the limb of a crank handle 64, which may be slidably and rotatably mounted on the outer end of the stud shaft 60, and confined thereon by a disk 65 and bolt 66, see Fig. 1. When the stud 60 and pinion 61 are in place the clutch faces 63 on the crank can be engaged with the clutch faces 62 of the gear 61 and then by turning the crank gear 61 will be rotated and cause pinion 21ᴾ and shaft 21 to rotate and the latter through pinion 33 and gear 32 will rotate shaft 20; which in turn will rotate the motor shaft with which it is engaged as hereinbefore explained, and thus start the motor. After the motor is started the stub shaft 60 with gear 61 and crank 64 can be removed, and the housing 50 replaced. The ratio of the gears 61 and 21ᴾ is preferably the same as the ratio of the gears 32 and 33.

The construction described provides a novel compact speed amplifying means for driving the pump rotor from the engine shaft and conserves space and weight which are very necessary requirements when the pump attachment is placed on the front end of the vehicle.

I claim:

1. A pump attachment for the purpose specified, a casing, a driving shaft, a pair of rotatable sleves within the casing and supporting said shaft; one of said sleeves being slidable longitudinally of the shaft; a gear rotatable with the shaft; positive clutch members adapted to be engaged and disengaged by the shifting of said movable sleeve; friction clutch members adapted to be engaged and disengaged by the movement of said movable sleeve, spring means whereby the friction members are caused to be engaged to rotate the gear before the positive clutch members are engaged; a pump mounted on the casing; and means for driving the pump shaft from said gear.

2. In a pump attachment for the purpose specified, a casing, a driving shaft, a pair of rotatable sleeves mounted in ball bearings within the casing and supporting said shaft; one of said sleeves and bearings being slidable longitudinally of the shaft; a gear rotatable with the shaft; positive clutch members adapted to be engaged and disengaged by the shifting of said movable sleeve; friction clutch members connected with the opposite sleeves adapted to be engaged and disengaged by the movement of said movable sleeve, spring means for normally holding one of the friction members projected, so that the friction members would be engaged and cause the gear to rotate before the positive clutch members are engaged; a centrifugal pump mounted on the casing having a shaft, and means for operating the pump shaft from said gear.

3. In a pump attachment as set forth in claim 2, said means for operating the pump shaft including a helical pinion engaging the gear, the gear being helical and adapted to exert an axial force or end thrust in a direction opposite to or opposing the axial force or end thrust of the impeller of the pump.

4. In a pump attachment as set forth in claim 2, said means for operating the pump shaft including a helical pinion engaging the gear, the gear being helical and adapted to resist the thrust of the spring which forces the friction clutch members into engagement; said spring opposing the end thrust of said helical gear.

5. In a pump attachment as set forth in claim 2, said means for operating the pump shaft including a helical pinion engaging the gear, the gear being helical, and the ball bearings being adapted to carry the radial load of the driving shaft and the axial load of the clutch members, and the friction clutch actuating spring being adapted to cause the engagement of the friction clutch and resist the end thrust of the helical gear.

6. In a pump attachment for the purpose specified, a casing, a drive shaft, a pair of rotatable sleeves mounted in ball bearings within the casing and supporting said shaft; one of said sleeves and bearings being slidable longitudinally of the shaft, a gear rotatable with the shaft; positive clutch members on the opposed ends of the sleeves adapted to be engaged and disengaged by the shifting of said movable sleeve; friction clutch members connected with the opposite sleeves adapted to be engaged and disengaged by the shifting of said movable sleeve, spring means for normally holding one of the friction members projected, so that the friction member will be engaged and cause the gear to rotate before the positive clutch members are engaged and means for shifting said movable sleeve.

7. In a pump attachment for the purpose specified, a casing, a drive shaft, a pair of rotatable sleeves mounted in ball bearings within the casing and supporting said shaft; one of said sleeves and bearings being slidable longitudinally of the shaft, a gear rotatable with the shaft; positive clutch members adapted to be engaged and disengaged by the shifting of said movable sleeve; friction clutch members adapted to be engaged and disengaged by the shifting of said movable sleeve, spring means for normally holding one of the friction members projected, so that the friction members will be engaged and cause the gear to rotate before the positive clutch members are engaged, means for shifting said movable sleeve; a centrifugal pump mounted on the casing and having a shaft extending into the casing parallel with the drive shaft; a pinion fast on the pump shaft meshing with said gear, and ball bearings for said pump shaft in the casing at opposite sides of said pinion.

8. In a pump attachment as set forth in claim 7, the gear and pinion being helical and adapted to exert an axial force or end thrust in a direction opposite to or opposing the axial force or end thrust of the impeller of the pump.

9. In a pump attachment as set forth in claim 7, the gear and pinion being helical and adapted to resist the thrust of the spring which forces the friction clutch members into engagement; said spring opposing the end thrust of said helical gear.

10. In a pump attachment as set forth in claim 7, the gear and pinion being helical, and the ball bearings for the driving shaft being adapted to carry the radial load of the driving shaft and the axial load of the clutch members, and the friction clutch actuating spring being adapted to cause the engagement of the friction clutch and resist the end thrust of the helical gear.

11. In a pump attachment as set forth in claim 7, the gear and pinion being helical, and the ball bearings for the driving shaft being adapted to carry the radial load of the driving shaft and the axial load of the clutch members; and the ball bearings of the pump shaft being adapted to exert an axial force or end thrust in a direction opposite to or opposing the axial force or end thrust of the impeller of the pump.

12. In a pump attachment as set forth in claim 7, the gear and pinion being helical, the ball bearings for the driving shaft being adapted to carry the radial load of the driving shaft and the axial load of the clutch members; the ball bearings of the pump shaft being adapted to exert an axial force or end thrust in a direction opposite to or opposing the axial force or end thrust of the impeller of the pump; and the friction clutch actuating spring being adapted to cause the engagement of the friction clutch and resist the end thrust of the helical gear.

13. In a pump attachment for the purpose specified, a casing, a drive shaft, a pair of rotatable sleeves mounted in ball bearings within the casing and supporting said shaft; one of said sleeves and bearings being slidable longitudinally of the shaft, a gear rotatable with the shaft; positive clutch members on the opposed ends of the sleeves adapted to be engaged and disengaged by the shifting of said movable sleeve; friction clutch members connected with the opposite sleeves adapted to be engaged and disengaged by the shifting of said movable sleeve, spring means for normally holding one of the friction members projected, so that the friction member will be engaged and cause the gear to rotate before the positive clutch members are engaged; means for shifting said movable sleeve; a centrifugal pump mounted on the casing and having a shaft extending into the casing parallel with the drive shaft; a pinion fast on the pump shaft meshing with said gear; and ball bearings for said pump shaft in the casing at opposite sides of said pinion.

14. In a pump attachment as set forth in claim 13, the gear and pinion being helical, and the ball bearings for the driving shaft being adapted to carry the radial load of the driving shaft and the axial load of the clutch members, and the friction clutch actuating spring being adapted to cause the engagement of the friction clutch and resist the end thrust of the helical gear.

15. In a pump attachment as set forth in claim 13, the gear and pinion being helical, the ball bearings for the driving shaft being adapted to carry the radial load of the driving shaft and the axial load of the clutch members; the ball bearings of the pump shaft being adapted to exert an axial force or end thrust in a direction opposite to or opposing the axial force or end thrust of the impeller of the pump; and the friction clutch actuating spring being adapted to cause the engagement of the friction clutch and resist the end thrust of the helical gear.

16. In a pump for motor vehicles having means for operatively connecting the pump shaft and the motor shaft when the pump is applied to a vehicle; a pinion on the pump shaft, a gear and crank assembly detachably attachable to the pump, said gear engaging said pinion when said assembly is attached to the pump, and whereby the motor may be manually cranked through the pump.

17. For a pump as set forth in claim 16, a detachable housing for said gear mountable upon the pump interchangeably with the said gear and crank assembly.

18. In a pump attachment for motor vehicles having means for operatively connecting the pump shaft with the motor shaft when the attachment is applied to a vehicle; a pinion on the pump shaft, an assembly comprising a stub shaft and a gear and the crank thereon, crank and gear having interengageable clutch faces and the crank being movable on the stub shaft to and from the gear; the said assembly being detachably attachable to the pump casing; said gear engaging said pinion when the assembly is attached to the casing and by which assembly the pump shaft may be rotated to manually start the motor.

19. For an attachment as set forth in claim 18, a detachable housing for said gear mountable upon the pump casing interchangeably with the said assembly.

In testimony that I claim the foregoing as my own, I affix my signature.

DE WITT E. YATES.